(12) United States Patent
Boyle et al.

(10) Patent No.: US 8,954,091 B1
(45) Date of Patent: Feb. 10, 2015

(54) METHOD AND SYSTEM FOR WAYFINDING AT A VENUE

(71) Applicant: Joingo, LLC, San Jose, CA (US)

(72) Inventors: Stephen S. Boyle, Lincoln, CA (US);
Russell S. Greer, Los Gatos, CA (US);
Thang Dao, San Jose, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

(21) Appl. No.: 14/451,336

(22) Filed: Aug. 4, 2014

Related U.S. Application Data

(63) Continuation of application No. 14/145,798, filed on Dec. 31, 2013, now Pat. No. 8,798,643, which is a continuation of application No. 14/016,185, filed on Sep. 2, 2013, now Pat. No. 8,738,036.

(60) Provisional application No. 61/828,657, filed on May 29, 2013.

(51) Int. Cl.
*H04W 24/00* (2009.01)
*H04W 4/02* (2009.01)
*H04W 52/02* (2009.01)
*H04W 64/00* (2009.01)

(52) U.S. Cl.
CPC .............. *H04W 4/023* (2013.01); *H04W 4/026* (2013.01); *H04W 4/027* (2013.01); *H04W 52/0251* (2013.01); *H04W 64/006* (2013.01)
USPC ..................................................... 455/456.1

(58) Field of Classification Search
USPC .......................................... 455/456.1–456.3
See application file for complete search history.

(56) References Cited

U.S. PATENT DOCUMENTS

2013/0045750 A1* 2/2013 Kim et al. .................. 455/456.1
2013/0196681 A1* 8/2013 Poduri et al. ............... 455/456.1

* cited by examiner

*Primary Examiner* — Joel Ajayi
(74) *Attorney, Agent, or Firm* — Clause Eight IPS; Michael Catania

(57) ABSTRACT

A system and method for wayfinding at a venue is disclosed herein. The system includes a mobile communication device and a venue. The mobile communication device includes an application for wayfinding at the venue and a plurality of sensors. The mobile communication device is configured to track a path of the mobile communication device from the first fixed geographical location utilizing a plurality of sensors of the mobile communication device.

19 Claims, 15 Drawing Sheets

METHOD AND SYSTEM FOR WAYFINDING AT A VENUE

CROSS REFERENCES TO RELATED APPLICATIONS

The present application is a continuation application of U.S. patent application Ser. No. 14/145,798, filed on Dec. 31, 2013, which is a continuation application of U.S. patent application Ser. No. 14/016,185 filed on Sep. 2, 2013, now U.S. Pat. No. 8,738,036, issued on May 27, 2014, which claims priority to U.S. Provisional Patent Application No. 61/828,657, filed on May 29, 2013, all of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to wayfinding at a venue. More specifically, the present invention relates to a method and system for wayfinding a mobile communication device at a venue.

2. Description of the Related Art

The prior art discusses various methods for indoor positioning.

One reference is Lundquist et al., U.S. Pat. No. 8,498,811 for a Method And Device For Indoor Positioning, which discloses a user carried device with a direction sensor.

Another example is Mendelson, U.S. Patent Publication Number 20070001904 for a System And Method Navigating Indoors And Outdoors Without GPS Utilizing Network Sensors, which discloses the use of RF sensors.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Direct Inward Dialing ("DID") involves a carrier providing one or more trunk lines to a customer for connection to the customer's private branch exchange ("PBX") and a range of telephone lines are allocated to this line.

Freemium is offering a first service free and then if warranted offering a second service for a fee.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Interactive voice response ("IVR") is a telephone technology in which a user uses a phone to interact with a database to acquire information.

Long Term Evolution ("LTE") is a next generation communication network.

Multimedia messaging service ("MMS") communication is a communication transmitted to and from a mobile phone that includes a multimedia content such as a digital photograph (JPEG), videos, and the like.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Transfer Control Protocol/Internet Protocol ("TCP/IP") is a protocol for moving files over the Internet.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Wayfinding is defined as tracking an object within a predetermined space.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

WiFi is wireless networking using the 802.11 communication standard from the IEEE (802.11 ac is the latest version) and transmitting at 2.4 GHz or 5 GHz.

Wireless Application Protocol is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

Wireless Application Protocol Push is defined as an encoded Wireless Application Protocol content message delivered (pushed) to a mobile communication device which includes a link to a Wireless Application Protocol address.

There is a need for maneuvering within a venue.

BRIEF SUMMARY OF THE INVENTION

One aspect of the present invention is a method for wayfinding at a venue.

Another aspect of the present invention is a system for communicating between a mobile communication device and a venue server to determine a device location at a venue utilizing data from the mobile communication device. The system includes a mobile communication device and a venue. The mobile communication device comprises an application, a plurality of sensors, a battery, and a plurality of possible paths. The venue comprises a venue network with a venue server, a HTTP proxy and plurality of wireless access points. The mobile communication device is configured to utilize the venue network to determine a first fixed geographical location of the mobile communication device at the venue. The mobile communication device is configured to track a path of the mobile communication device from the first fixed geographical location utilizing a plurality of sensors of the mobile communication device in conjunction with the plurality of possible paths. The mobile communication device is configured to utilize a venue network to determine a second fixed geographical location of the mobile communication device at the venue. The mobile communication device is configured to calculate an error factor for the tracking the path of the mobile communication device from the first fixed geographical location for the mobile communication device to the second fixed geographical location for the mobile communication device. Subsequent approximations of the handset location from the latest fixed geographical location are made using the plurality of sensors, plurality of possible paths, and the error factor which improves accuracy of approximation over time.

The tracked path can be overlayed on a map of the venue on the mobile communication device or graphical user interface for a server of the venue. A remote server is preferably in communication with the venue network over a communications network.

The venue is preferably one of an airport, a retail mall, a casino resort, a hospital, a hotel, a convention center, a university, a school, an amusement park, and a municipality.

Yet another aspect of the present invention is an over-the-top ("OTT") WiFi system for a venue.

Yet another aspect of the present invention is indoor mapping and guidance without the use of a GPS system.

The venue is preferably one of an airport, a retail mall, a casino resort, a hospital, a hotel, a convention center, a university, a school, an amusement park, and a municipality. However those skilled in the pertinent art will recognize that the venue may be another area, building or the like without departing from the scope and spirit of the present invention.

Another aspect of the present invention is a method for wayfinding at a venue. The method includes launching a mobile application on a mobile communication device within a venue. The mobile application is for wayfinding at the venue. The method also includes utilizing a venue network to determine a first fixed geographical location of the mobile communication device at the venue. The method also includes tracking a path of the mobile communication device from the first fixed geographical location utilizing a plurality of sensors of the mobile communication device. The method also includes utilizing a venue network to determine a second fixed geographical location of the mobile communication device at the venue.

The method also further includes transmitting venue content to the mobile communication device based on the path of the mobile communication from the first fixed geographical location to the second fixed geographical location. The venue is a casino resort and the venue content is an offer from a bank of slot machines along the path of the mobile communication device, the venue is a retail shopping mall and the venue content is an offer from a retail store along the path of the mobile communication device, or the venue is a retail mall and the venue content is an electronic gift card for purchases at the retail mall.

The method also further includes illustrating the path of the mobile communication device on a display of the mobile communication device.

Yet another aspect of the present invention is a system for wayfinding at a venue. The system includes a mobile communication device and a venue. The mobile communication device includes an application for wayfinding at the venue and a plurality of sensors. The venue includes a venue network with a plurality of wireless access points. The mobile communication device is configured to utilize the venue network to determine a first fixed geographical location of the mobile communication device at the venue. The mobile communication device is configured to track a path of the mobile communication device from the first fixed geographical location utilizing a plurality of sensors of the mobile communication device. The mobile communication device is configured to utilize a venue network to determine a second fixed geographical location of the mobile communication device at the venue.

The plurality of sensors of the mobile communication device comprises an accelerometer, a magnetometer and a gyroscope.

Yet another aspect of the present invention is a method for wayfinding at a venue using an error factor. The method includes launching an application on a mobile communication device within a venue. The application is for wayfinding at the venue. The method also includes generating a first fixed geographical location of the mobile communication device at the venue utilizing a venue network. The method also includes tracking a path of the mobile communication device from the first fixed geographical location utilizing a plurality of sensors of the mobile communication device. The method also includes generating a second geographical location for the mobile communication device within a meter of the first fixed geographical location for the mobile communication device. The method also includes calculating an error factor for the tracking the path of the mobile communication device from the first fixed geographical location for the mobile communication device to the second fixed geographical location for the mobile communication device. The error factor is utilized for the tracking a subsequent path of the mobile communication device within the venue.

Yet another aspect of the present invention is a method for wayfinding at a venue by adjusting estimated geographical location. The method includes launching an application on a mobile communication device within a venue, the application for wayfinding at the venue. The method also includes generating a first fixed geographical location of the mobile communication device at the venue utilizing a venue network. The method also includes tracking a path of the mobile communication device from the first fixed geographical location utilizing a plurality of sensors of the mobile communication device to generate an estimated geographical location of the mobile communication device at the venue. The method also includes generating a second geographical location for the mobile communication device at the venue utilizing the venue network. The method also includes adjusting estimated geographical location of the mobile communication device based on the second geographical location for the mobile communication device. The method also includes calculating an error factor for the tracking the path of the mobile communication device from the first fixed geographical location for the mobile communication device to the second fixed geographical location for the mobile communication device. The error factor is utilized for the tracking a subsequent path of the mobile communication device within the venue.

Yet another aspect of the present invention is a method for wayfinding at a venue while conserving battery power of a mobile communication device. The method includes launching an application on a mobile communication device within a venue. The application for wayfinding at the venue, the mobile communication device comprising a battery. The method also includes generating a first fixed geographical location of the mobile communication device at the venue utilizing a venue network. The method also includes tracking a path of the mobile communication device from the first fixed geographical location utilizing a plurality of sensors of the mobile communication device. The method also includes generating a second geographical location for the mobile communication device at the venue utilizing the venue network. The method also includes moving a current location of the path of the mobile communication device to the second geographical location for the mobile communication device at the venue. The method also includes suspending request transmissions from the mobile communication device while an accelerometer sensor of the mobile communication device indicates a lack of movement.

Yet another aspect of the present invention is a system for wayfinding at a venue while conserving battery power of a mobile communication device. The system includes a mobile communication device and a venue. The mobile communication device comprises an application for wayfinding at the venue, a plurality of sensors and a battery. The venue comprising a venue network with a plurality of wireless access points. The mobile communication device is configured to utilize the venue network to determine a first fixed geographical location of the mobile communication device at the venue. The mobile communication device is configured to track a path of the mobile communication device from the first fixed geographical location utilizing a plurality of sensors of the mobile communication device. The mobile communication device is configured to utilize a venue network to determine a second fixed geographical location of the mobile communication device at the venue. The mobile communication device is configured to move a current location of the path of the mobile communication device to the second geographical location for the mobile communication device at the venue. The mobile communication device is configured to suspend request transmissions from the mobile communication device while an accelerometer sensor of the mobile communication device indicates a lack of movement.

Yet another aspect of the present invention is a system for wayfinding at a venue by calculating an error factor. The system includes a mobile communication device and a venue. The mobile communication device comprises an application for wayfinding at the venue, a plurality of sensors and a battery. The venue comprises a venue network with a plurality of wireless access points. The mobile communication device is configured to utilize the venue network to determine a first fixed geographical location of the mobile communication device at the venue. The mobile communication device is configured to track a path of the mobile communication device from the first fixed geographical location utilizing a plurality of sensors of the mobile communication device. The mobile communication device is configured to utilize a venue network to determine a second fixed geographical location of the mobile communication device at the venue within a meter of the first fixed geographical location for the mobile communication device. The mobile communication device is configured to calculate an error factor for the tracking the path of the mobile communication device from the first fixed geographical location for the mobile communication device to the second fixed geographical location for the mobile communication device. The error factor is utilized for the tracking a subsequent path of the mobile communication device within the venue.

Yet another aspect of the present invention is a system for wayfinding at a venue by adjusting a path. The system includes a mobile communication device and a venue. The mobile communication device comprises an application for wayfinding at the venue, a plurality of sensors and a battery. The venue comprises a venue network with a plurality of wireless access points. The mobile communication device is configured to utilize the venue network to determine a first fixed geographical location of the mobile communication device at the venue. The mobile communication device is configured to track a path of the mobile communication device from the first fixed geographical location utilizing a plurality of sensors of the mobile communication device to generate an estimated geographical location of the mobile communication device at the venue. The mobile communication device is configured to utilize a venue network to determine a second fixed geographical location of the mobile communication device at the venue within a meter of the first fixed geographical location for the mobile communication device. The mobile communication device is configured to adjust the estimated geographical location of the mobile communication device based on the second geographical location for the mobile communication device. The mobile communication device is configured to calculate an error factor for the tracking the path of the mobile communication device from the first fixed geographical location for the mobile communication device to the second fixed geographical location for the mobile communication device. The error factor is utilized for the tracking a subsequent path of the mobile communication device within the venue.

Yet another aspect of the present invention is a system for wayfinding at a venue by guiding the mobile communication device. The system includes a mobile communication device and a venue. The mobile communication device comprises an application for wayfinding at the venue, a plurality of sensors and a battery. The venue comprises a venue network with a plurality of wireless access points. The mobile communication device is configured to utilize the venue network to determine a first fixed geographical location of the mobile communication device at the venue. The mobile communication device is configured to receive an input on the application for a second fixed geographical location within the venue. The mobile communication device is configured to guide an end user of the mobile communication device from the first fixed geographical location to the second fixed geographical location in the venue utilizing a plurality of sensors of the mobile communication device.

Yet another aspect of the present invention is a method for wayfinding at a venue by guiding the mobile communication device. The method includes launching a mobile application on a mobile communication device within a venue. The mobile application is for wayfinding at the venue. The method also includes utilizing a venue network to determine a first fixed geographical location of the mobile communication device at the venue. The method also includes inputting on the application a second fixed geographical location within the venue. The method also includes guiding an end user of the mobile communication device from the first fixed geographical location to the second fixed geographical location in the venue utilizing a plurality of sensors of the mobile communication device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
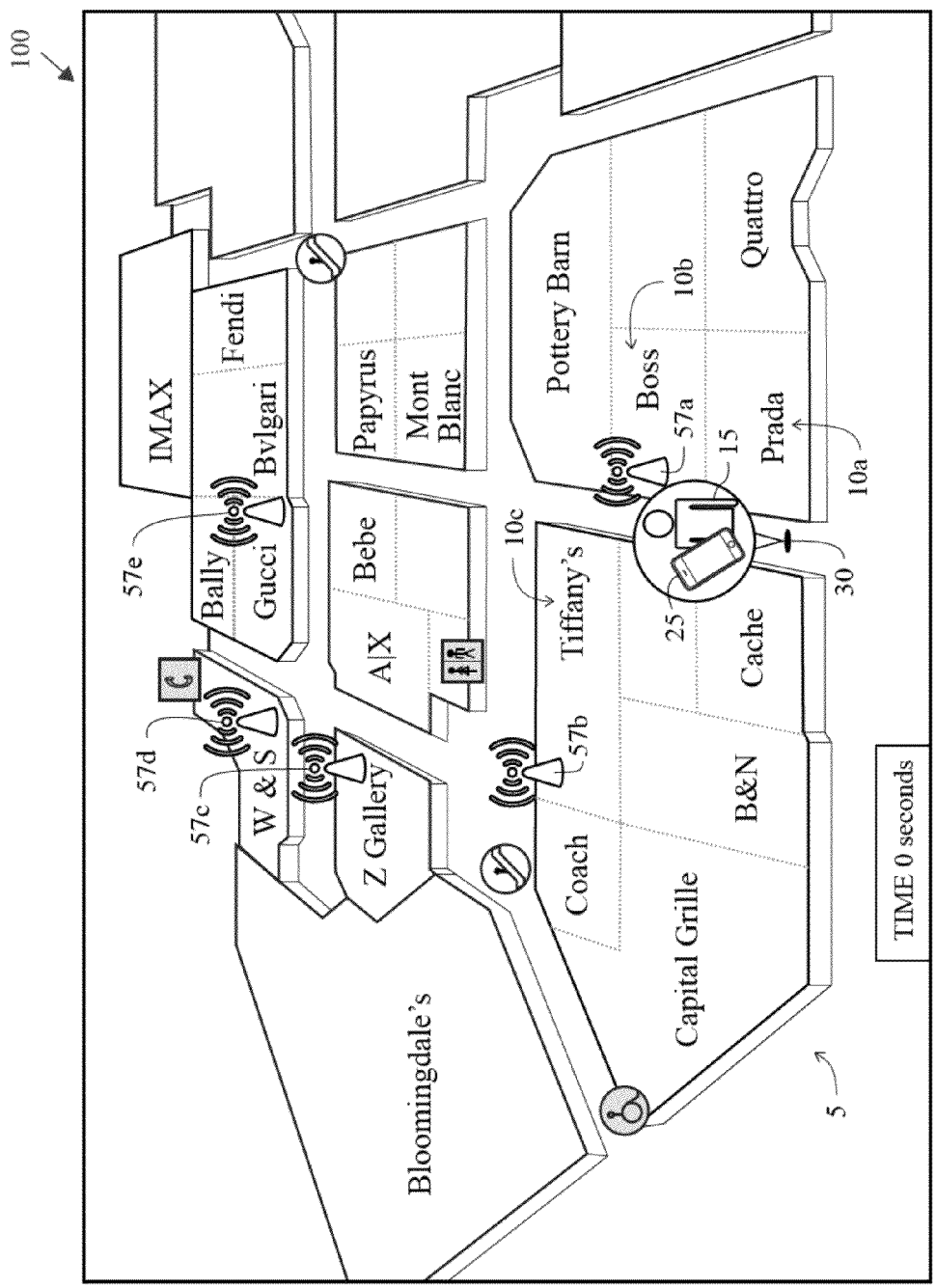
FIG. 1 is an illustration of a map of a retail mall illustrating a first fixed geographical location for a mobile communication device determined utilizing a venue network.
Figure 2:
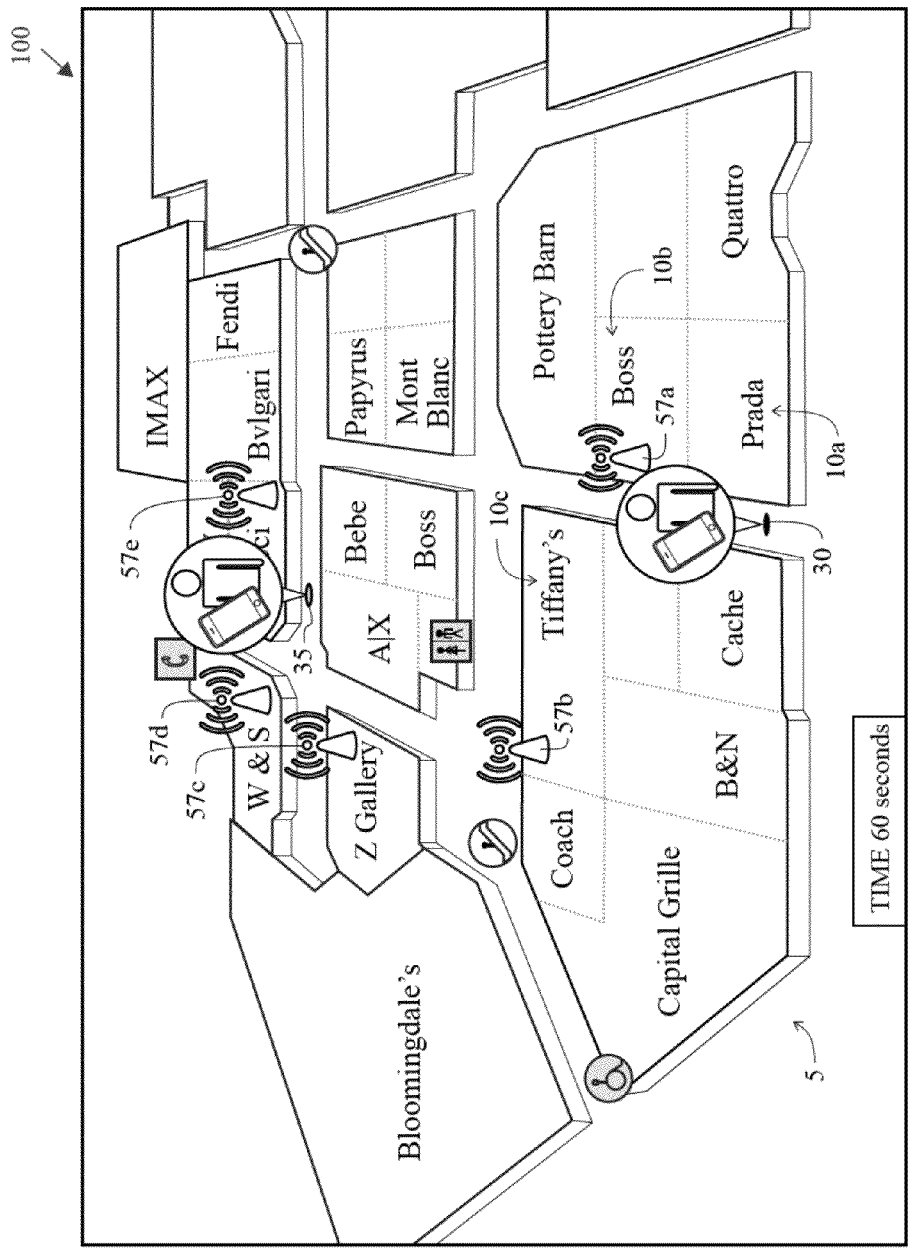
FIG. 2 is an illustration of a map of a retail mall illustrating a first fixed geographical location for a mobile communication device and a second fixed geographical location for a mobile communication device, both determined utilizing a venue network in accordance with the prior art.
Figure 2A:
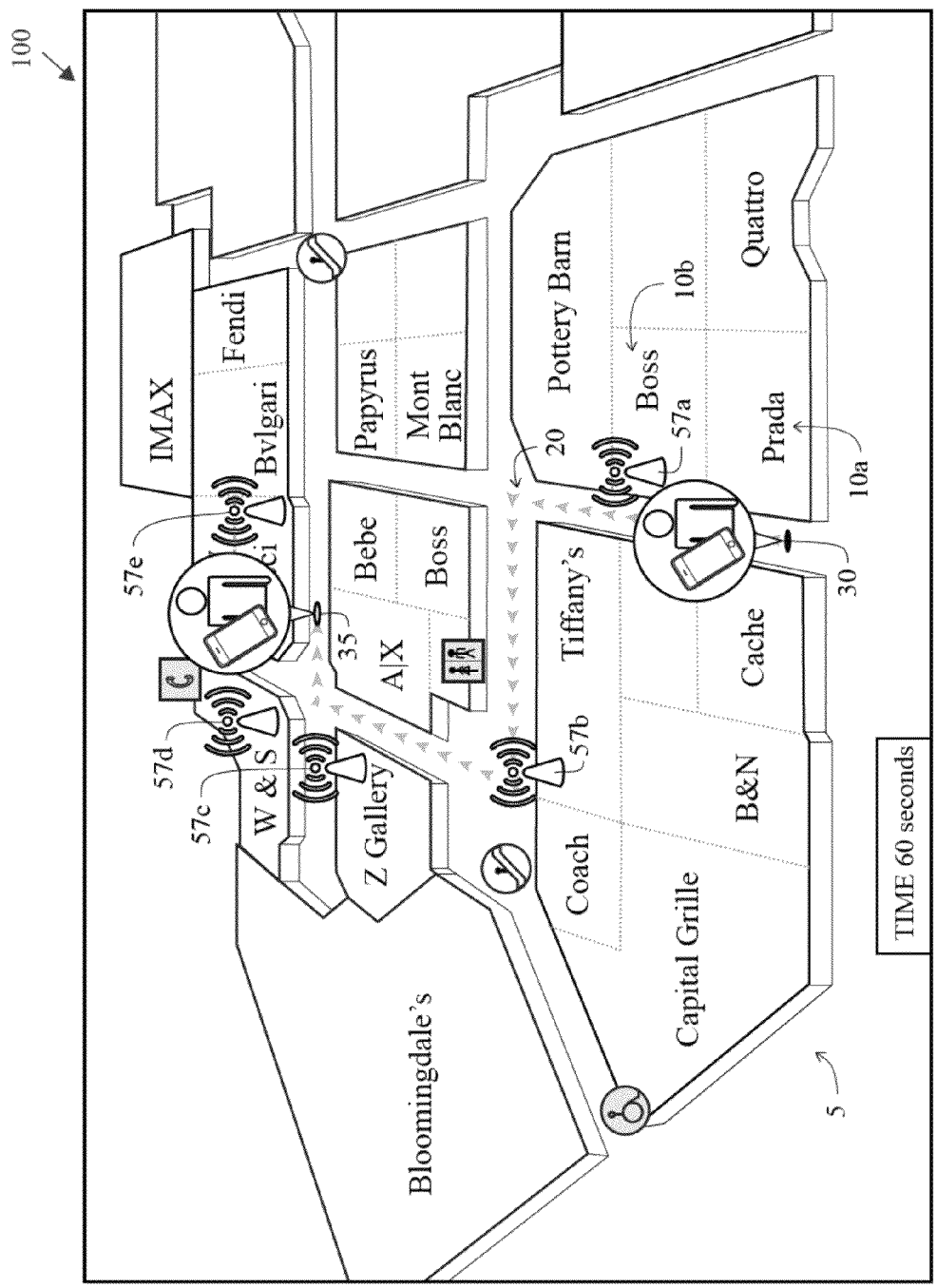
FIG. 2A is an illustration of a map of a retail mall illustrating a first fixed geographical location for a mobile communication device and a second fixed geographical location for a mobile communication device, both determined utilizing a venue network, and a tracking path determined by a plurality of sensors of the mobile communication device.

As shown in FIGS. 1, 2 and 2A, the system 100 of the present invention provides guidance through a venue 5. In FIGS. 1, 2 and 2A, the venue 5 is a retail mall with stores 10. In alternative examples, the venue is preferably one of an airport, a casino resort, a hospital, a hotel, a convention center, a university, a school, an amusement park, and a municipality. However those skilled in the pertinent art will recognize that the venue may be another area, building or the like without departing from the scope and spirit of the present invention. The venue 5 has a plurality of wireless access points ("WAPs") 57a, 57b, 57c, 57d, and 57e located throughout the mall. The WAPs are part of a venue network. An end user 15 has a mobile communication device 25. The end user enters the mall and either manually activates a mobile application on the mobile communication device 25 or the mobile application is activated automatically. At time zero, a first fixed geographical location 30 is determined for the mobile communication device 25 through communication with the venue network.

In one embodiment, the end user 15 walks through the mall 5. In another embodiment, a venue offer is sent to the mobile device 25 and the end user proceeds to the location of the venue offer.

In the prior art shown in FIG. 2, a second fixed geographical location 35 in the venue 5 is determined at time sixty seconds. However, there is no tracking, mapping or wayfinding of what path the end user took from the first fixed geographical location 30 to the second fixed geographical location 35 since in the prior art the location is only determined through a WLAN of a venue at that calculation is performed at set intervals, like every sixty seconds.

However, the present invention utilizes a plurality of sensors on the mobile device 25 to provide wayfinding, tracking or mapping as an end user moves through the venue. In a preferred embodiment, an accelerometer 301 of the mobile device 25 is configured to determine a movement of the mobile communication device 25 and an orientation of the movement, a magnetometer 319 is configured to determine a true north heading of the mobile communication device 25, and a gyroscope 320 is configured to determine an orientation of the mobile communication device 25. In this manner, the present invention is able to provide a path 20 from the first fixed geographical location 30 to the second fixed geographical location 35 as shown in FIG. 2A. In one embodiment, this path 20 is tracking the mobile device 25 through the venue. In another embodiment, the path 20 is directions from the first fixed geographical location 30 to the second fixed geographical location 35.

The guidance to the end user 15 from the mobile device 25 is provided as a display, a map, audio, tactile signals, text and the like.

The mobile device 25 is also preferably configured to calculate an error factor for the guidance provided from the plurality of sensors in order to provide a more defined path 20. The mobile device is also preferably configured to provide battery savings by deactivating the guidance processing while the accelerometer indicates that the mobile device 25 is not moving.

The mobile communication devices 25 utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Figure 3:
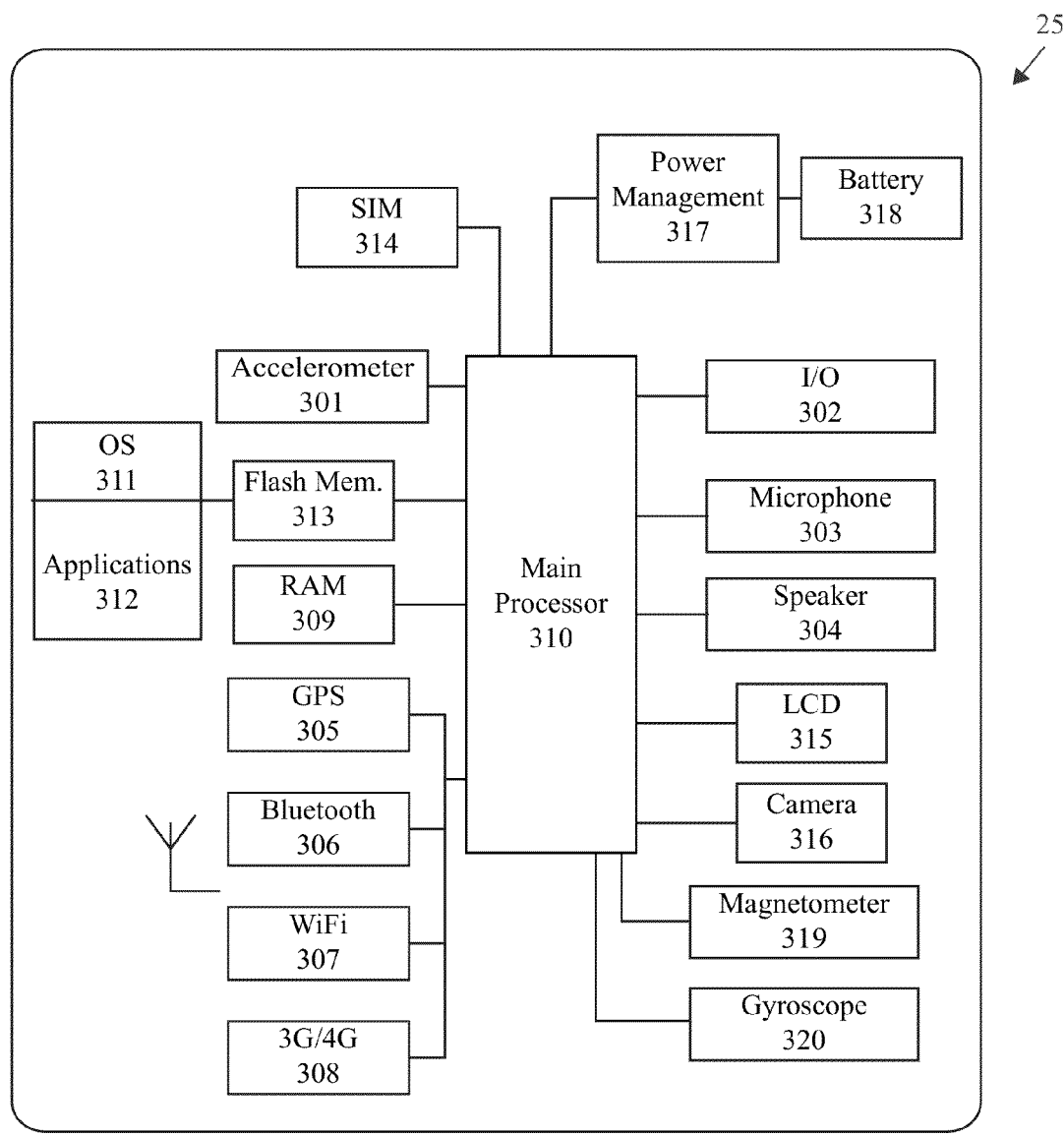
FIG. 3 is a block diagram of components of a mobile communication device.

As shown in FIG. 3, typical components of a mobile communication device 25 include an accelerometer 301, an input/output interface 302, a microphone 303, a speaker 304, a GPS chipset 305, a Bluetooth component 306, a WiFi component 307, a 3G/4G component 308, a RAM 309, a main processor 310, an operating system 311, applications 312, a flash memory 313, SIM card 314, LCD display 315, a camera 316, a power management circuit 317, a battery or power source 318, a magnetometer 319 and a gyroscope 320.

Positioning algorithms are preferably utilized in tracking the movement of the mobile device 25 through the venue 5. Seifert et al., Implementing Positioning Algorithms Using Accelerometers, Freescale Semiconductor Application Note, Rev. 0, 02/2007, AN3397, which is hereby incorporated by reference in its entirety, discloses several algorithms that may be utilized with the present invention. The accelerometer 301 preferably transmits X-axis, Y-axis and Z-axis signals for the motion of the mobile communication device 25 to an accelerometer data evaluation component of the main processor 310. One such accelerometer 301 is a multiple-axis accelerometer, such as the ADXL202 made by Analog Devices of Norwood, Mass., which is a standard micro-electronic-machine ("MEMs") module that measures acceleration and deceleration using an array of silicon-based structures. Another accelerometer 301 is the STMicro STM33DH accelerometer from STMicroelectronics. A magnetometer 319 is a magnetoresistive permalloy sensor that measures the strength and direction of a magnetic field, and is utilized as a compass in a mobile communication device 25. One preferred magnetometer is the AN-203 from Honeywell, which measures magnetic fields within a +/−2 gauss range, and is sensitive to magnetic fields of less than 100 microgauss. The magnetometer is preferably utilized to provide a heading to the geomagnetic North Pole (not the North Pole) which has a magnetic field of roughly 0.6 gauss. A gyroscope 320 is another sensor of the plurality of sensors for wayfinding for the mobile communication device 25. A gyroscope 320 measures orientation based on angular momentum. A preferred gyroscope 320 is the MEMS gyroscope from STMicroelectronics such as the STMicro L3G4200D gyroscope. With these three sensors, the accelerometer 301, the magnetometer 319 and the gyroscope 320, the mobile communication device 25 is able to utilize the information from the WLAN of the venue 5 to wayfind through the venue 5, and provide directions to the user of the mobile communication device 25.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network for communication to the mobile communication device of the end user.

The venue 5 is preferably a casino resort, a mall or a grocery store. Alternatively, the venue is an airport, a train station, an amusement park, or a business campus. A system includes a venue 5, comprising multiple WAPs 57.

Figure 4:
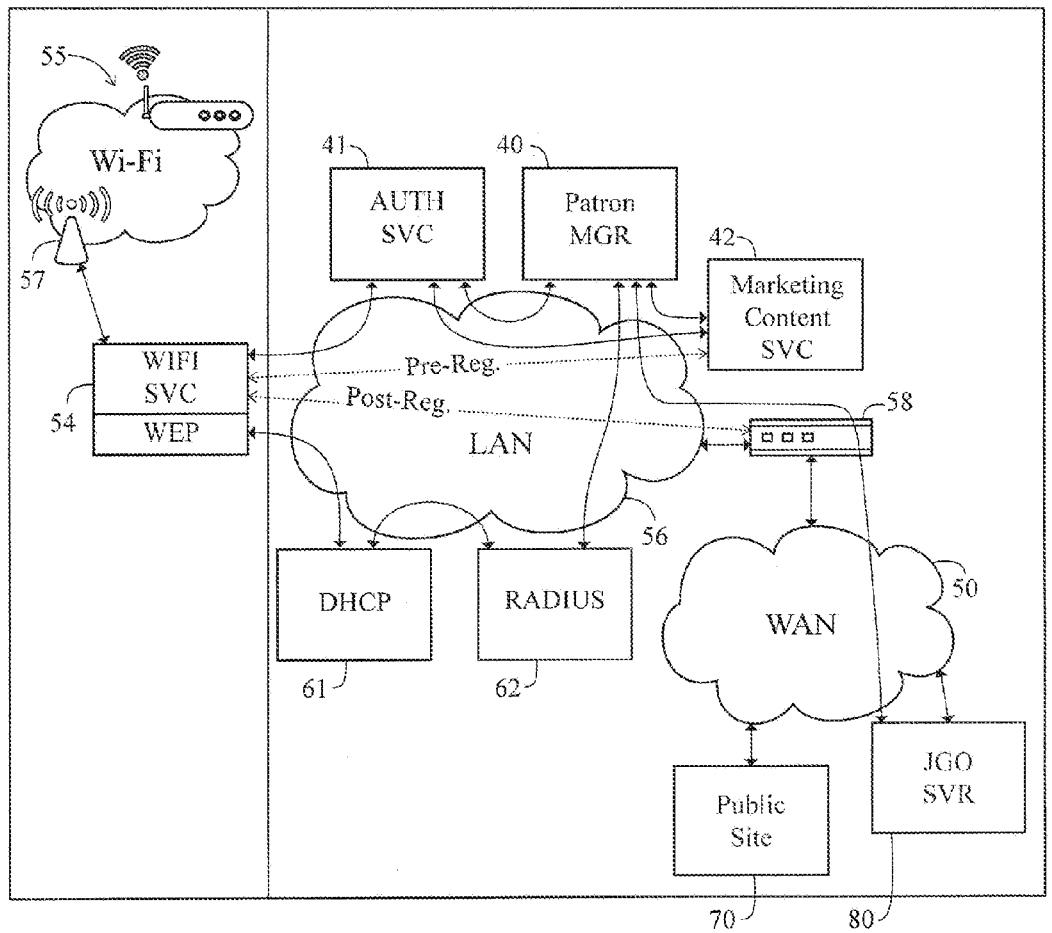
FIG. 4 is a block diagram of a system for wayfinding.

FIG. 4 is a block diagram of a system for wayfinding. A WAP 57 connects the WiFi server 54 to the WiFi system 55. The WiFi server communicates with the other services, such as Dynamic Host Configuration Protocol ("DHCP") 61, Remote Authentication Dial In User Service ("RADIUS") 62, authentication service 41, and marketing content service 42, and with the patron server 40 through the LAN 56. Communication with the remote server 80 and the content server 70 is through the Internet 50 through the firewall 58.

Figure 5:
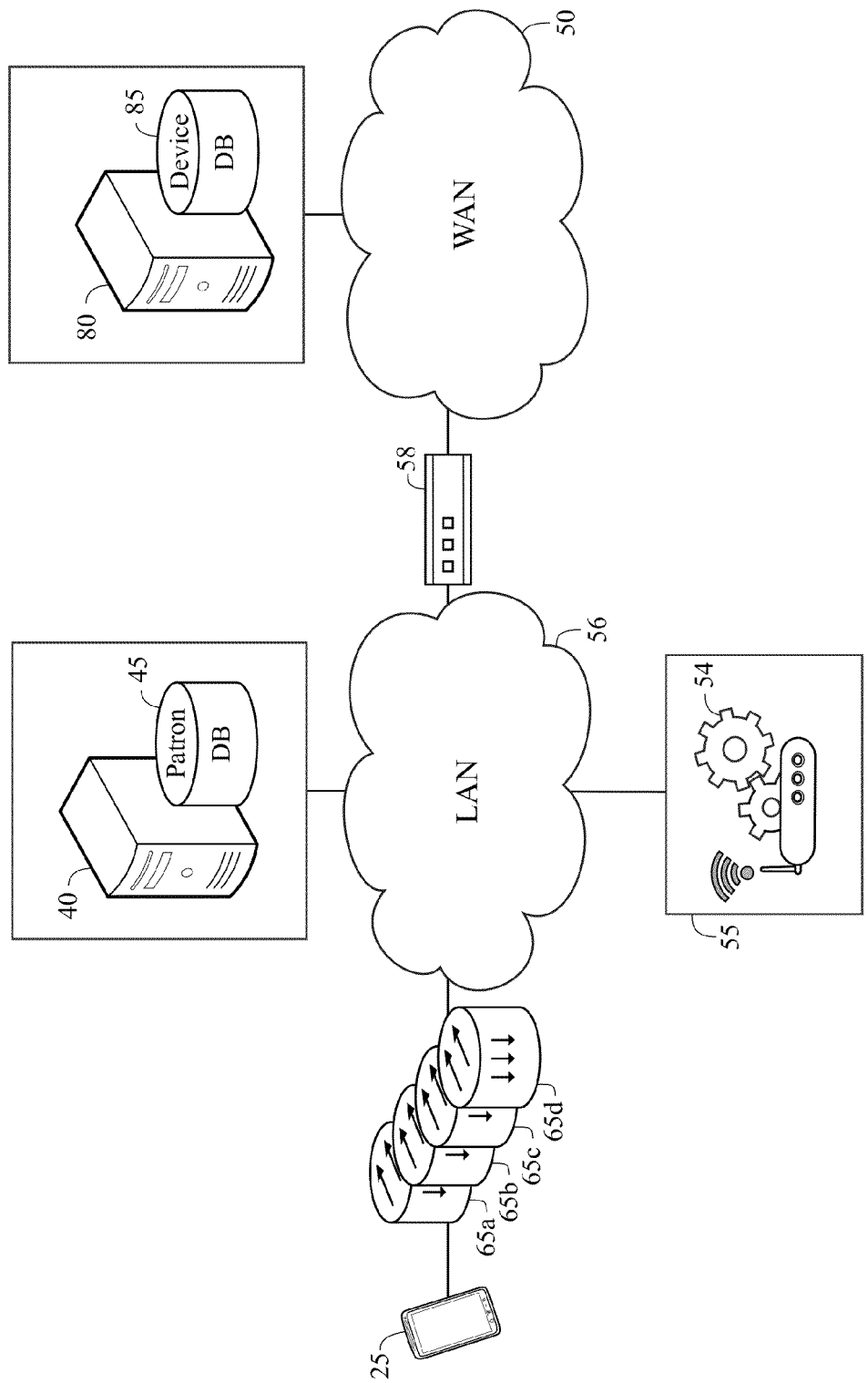
FIG. 5 is a block diagram of the implementation components of the system for wayfinding.

Another system for wayfinding is shown in FIG. 5. A mobile communication device 25 is monitored by POPs (point of presence) 65a-65d. The POPs 65a-65d are on the LAN 56. A patron server 40 and a patron database ("DB") 45 are also on the LAN 56. A WiFi server 54 of a WiFi system 55 is also on the LAN 56. The LAN 56 is in communication with a WAN 50 through a firewall 58. A remote server 80 and a remote DB 85 are in communication with the LAN 56 through the WAN 50. In a preferred embodiment, the WAN 50 is the Internet.

Figure 6:
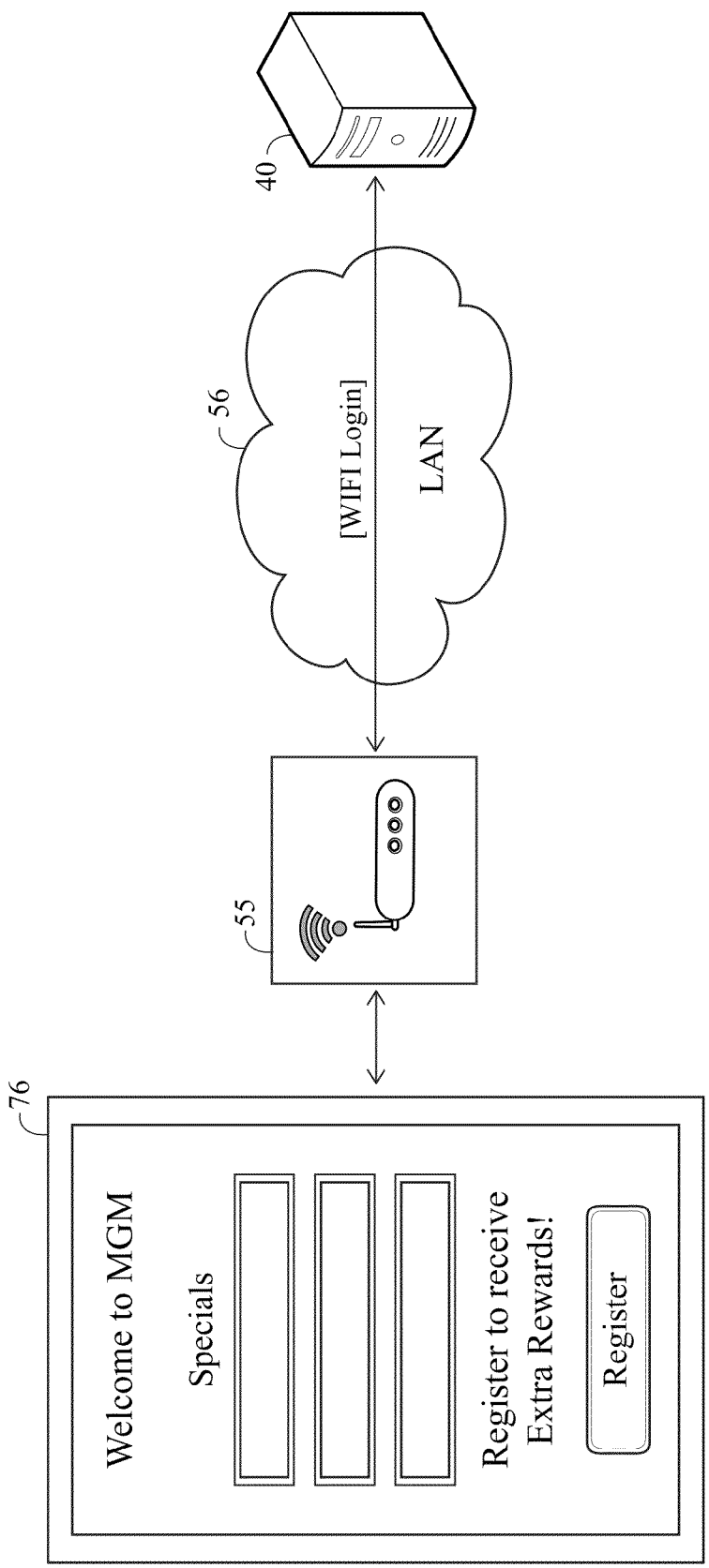
FIG. 6 is a block diagram of WiFi registration for use of the wayfinding system of the present invention.

FIG. 6 illustrates a WiFi registration for use of the wayfinding system. A registration message 76 is displayed on a mobile device, which is in communication with the WiFi system 55 of the venue. The WiFi system 55 is on the LAN 56, which is in communication with a patron server 40. Once a request for Internet access is received from the mobile communication device 25, a WiFi login message is sent to the device from the patron server 40 through the LAN 56.

Figure 7:
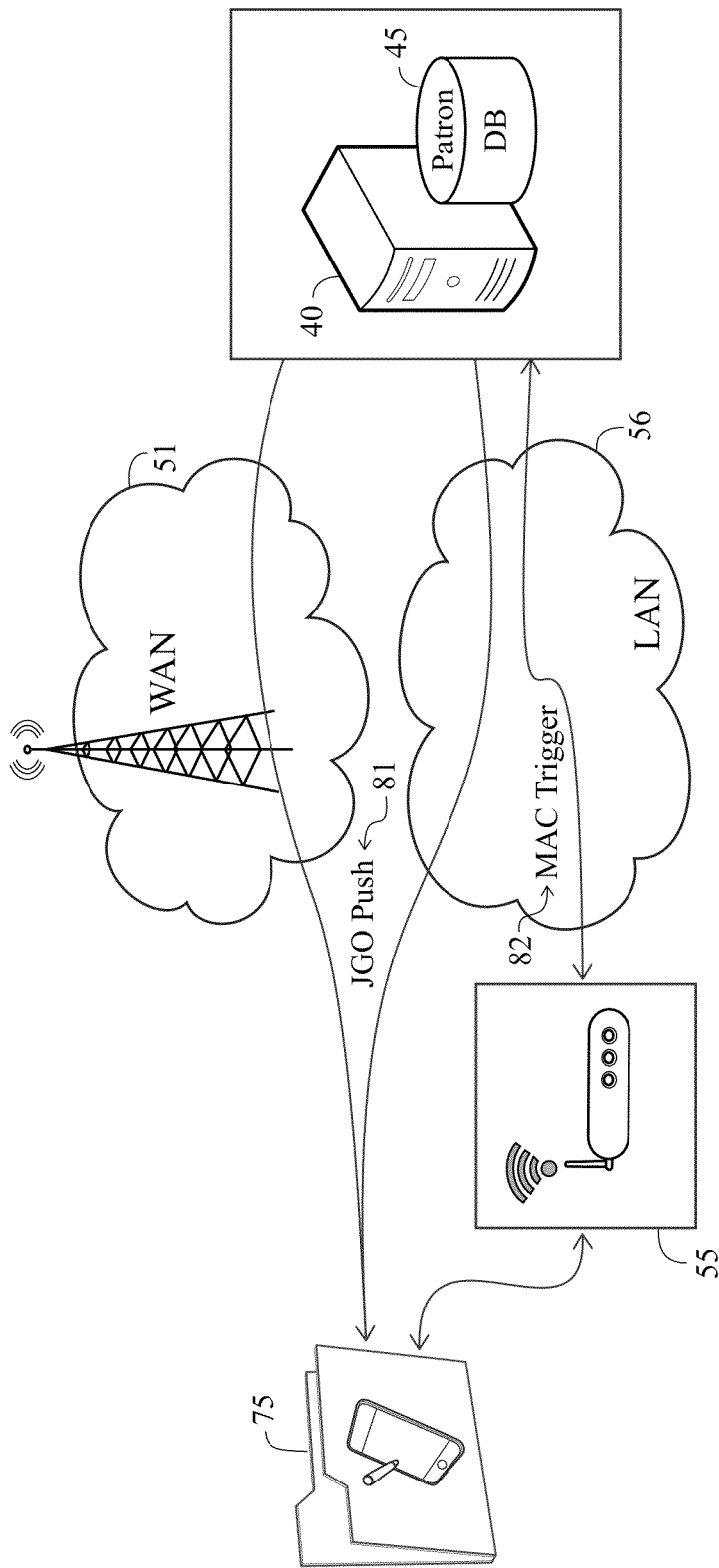
FIG. 7 is a block diagram of a MAC address trigger of the wayfinding system of the present invention.

FIG. 7 is an illustration of a MAC address triggering of an alert that a patron is on-site at a venue. A mobile application 75 on a mobile device 25 of a patron interacts with the WiFi system 55 of the venue. The Over The Air ("OTA") protocol senses the MAC of the patron's device and forwards the information to the patron server 40 over the LAN 56. Communication between the patron server 40 and the mobile application 75 is through the LAN 56, or alternatively through a WAN 51 of a communications network as an application push 81.

The patron DB 45 resolves the MAC address to the device to determine if the Guest is known or unknown. If an Unknown Guest enters the venue and the WiFi of the device is on, specials will be presented to the guest in a WiFi Login Page if the device auto connects or there is a data fetch. If a Known Guest enters the venue but does not have the application 75 installed on their device and the WiFi of the device is on, there will be an SMS push through the cellular WAN 51 for personalized offers presented to the guest in a WiFi Login Page if the device auto connects or there is a data fetch. If a Known Guest enters the venue with the application 75 installed on their device and the WiFi of the device is on, there will be a an application push 81 for personalized offers presented to the guest in a WiFi Login Page if the device auto connects or there is a data fetch. In each case, there will be a MAC Trigger 82 if the device has the WiFi on.

Figure 8:
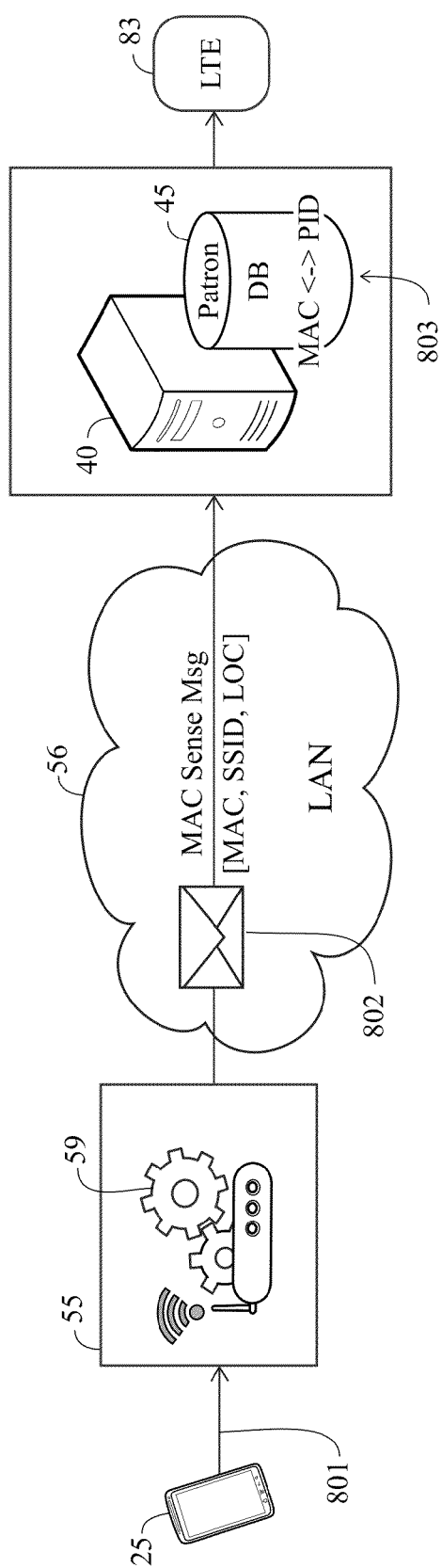
FIG. 8 is a block diagram of the message flows for MAC address sensing of the wayfinding system of the present invention.

FIG. 8 illustrates the message flow of a MAC address sensing by a POP 65. The device 25 scans the network for an 802.11 probe response 801. Once the WiFi system 55 picks up the device, the Mobility Services Engine ("MSE") 59 sends a MAC Sense message 802, including such information as the MAC address, the SSID, and the location, to the patron server 40. The MAC record is updated 803 in the patron DB 45 and the patron server 40 then produces a Location Trigger Event 83 as a push message event 1201.

Figure 9:
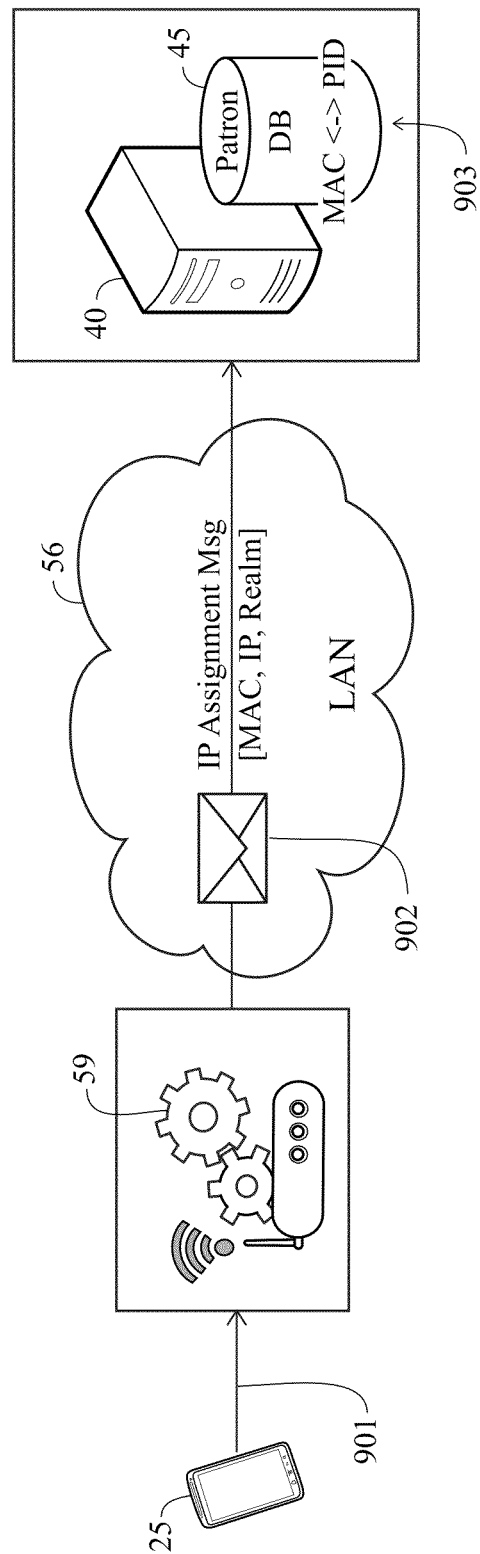
FIG. 9 is a block diagram of the message flows for IP address registration of the wayfinding system of the present invention.

FIG. 9 illustrates the message flow of IP registration of a device. The device 25 obtains an IP address through the DHCP server 901, the MSE 59 forwards the address information in an IP Assignment message 902, including such information as the MAC address, the IP address and the routing realm, to the patron server 40. The MAC record is updated 903 in the patron DB 45.

Figure 10:
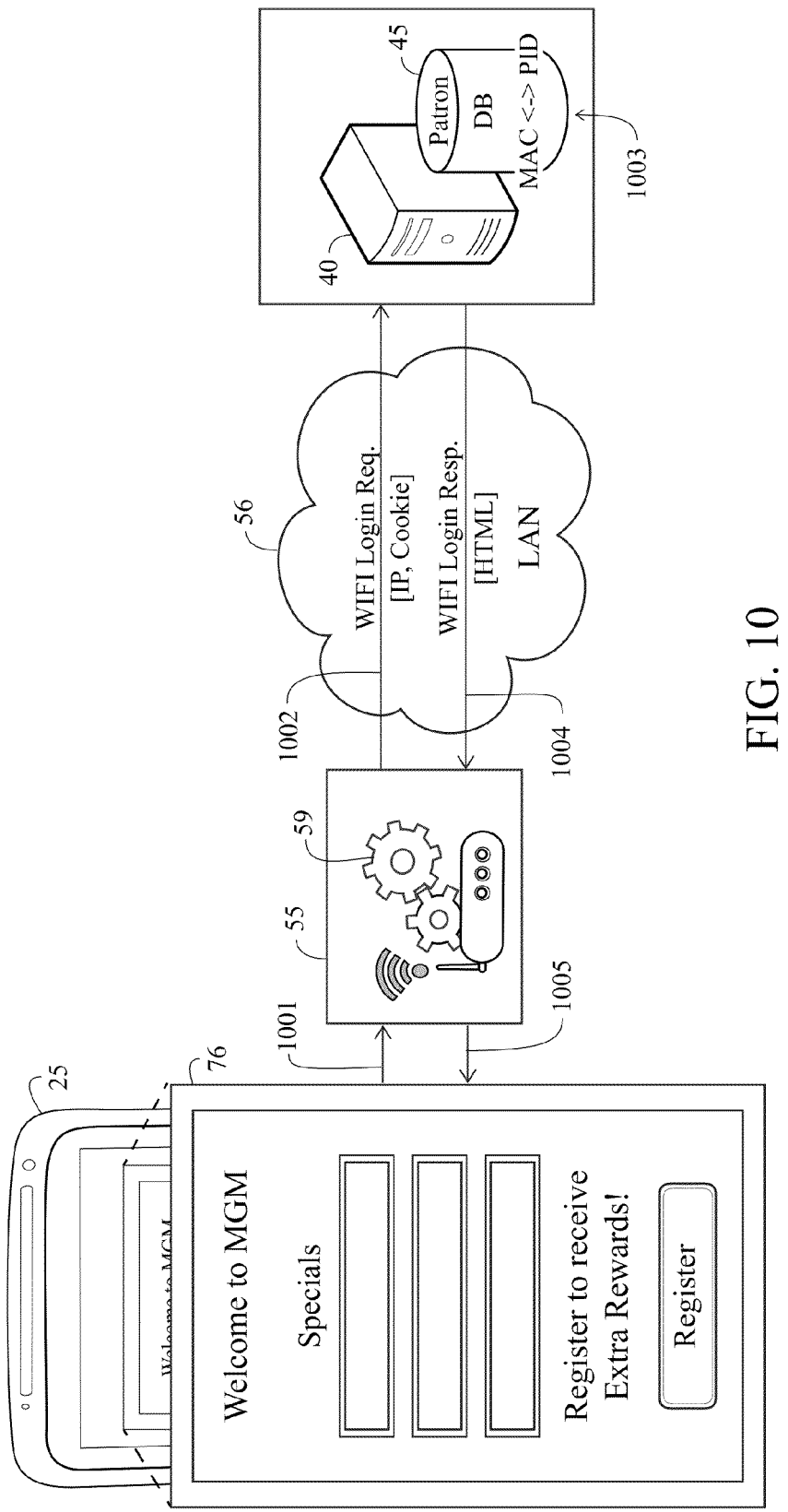
FIG. 10 is a block diagram of the message flows for WiFi login of the wayfinding system of the present invention.

FIG. 10 illustrates the message flow of a WiFi login. The device 25 scans and finds 1001a WiFi 55 network and the MSE 59 sends a WiFi Login request 1002, including the IP address and cookie information, to the patron server 40. The MAC record is updated 1003 in the patron DB 45 and the patron server 40 sends back a WiFi Login response 1004 in HTML format. The WiFi server 54 forwards the response 1004 to the device 25 to present the login page 76.

Figure 11:
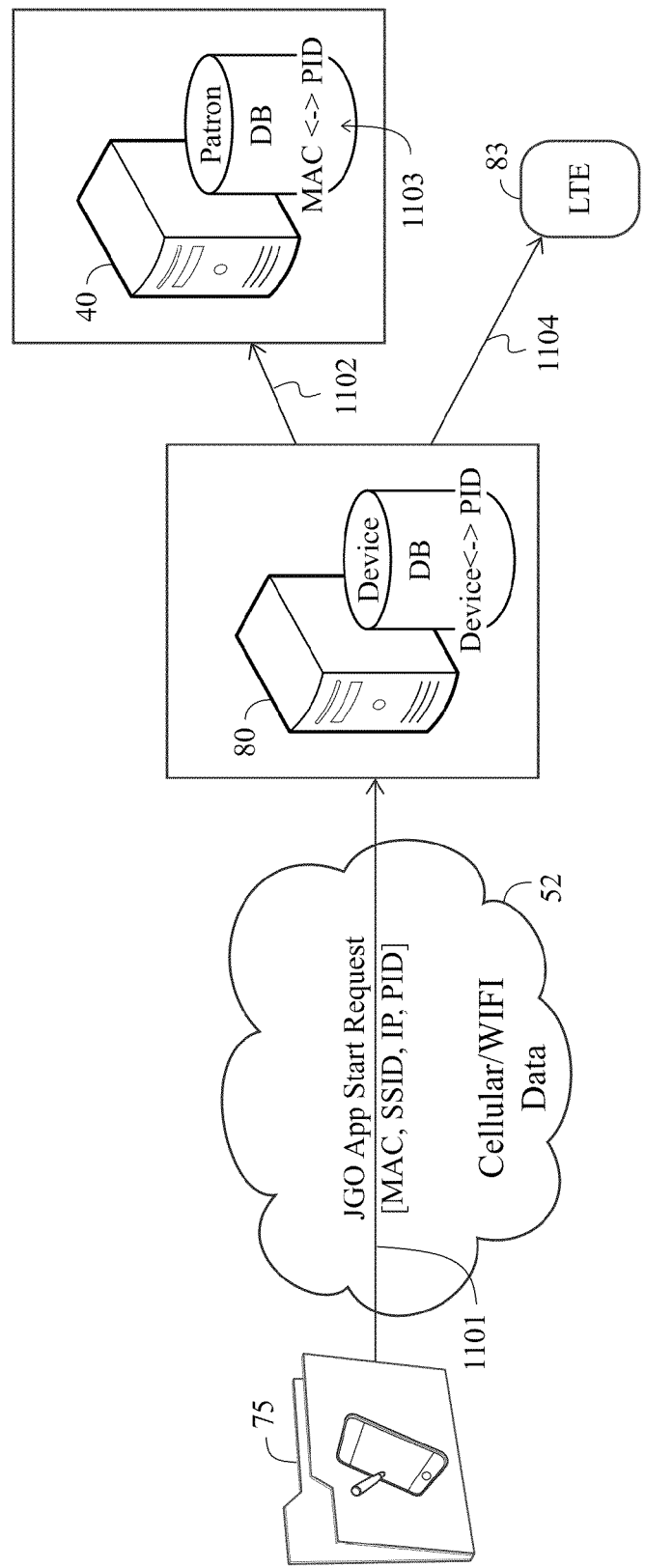
FIG. 11 is a block diagram of the message flows for an application start of the wayfinding system of the present invention.

FIG. 11 illustrates the message flow of the start of the application. The Client (the application 75 on the device 25) starts and makes the first request 1101 across the cellular/WiFi data network 52 to the remote server 80. Included in the request is data such as the MAC address, the SSID, the IP address, and the PID. The remote server 80 authenticates 1102 the Client's PID, password, MAC address, SSID, and IP address with the patron server 40. Then the patron server 40 associates 1103 the PID to the MAC and then the remote server 80 generates 1104 a Location Trigger Event 83.

Figure 12:
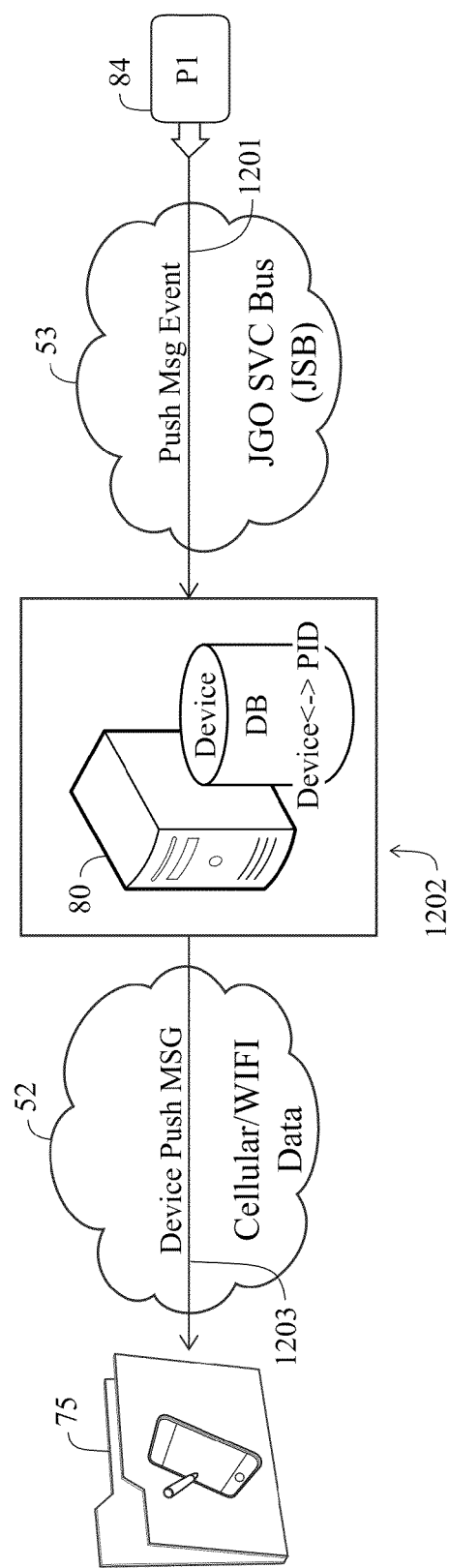
FIG. 12 is a block diagram of the message flows for push messaging of the wayfinding system of the present invention.

FIG. 12 illustrates the message flow of a Push Message. The producer of content 84 publishes a Push Message Event ("PME") 1201 on the JGO service bus (JSB) 53. The remote server 80 takes the PME and translates 1202 it into a Device Push Message 1203, delivering the Device Push Message 1203 back across the cellular/WiFi data network 52 to the application 75.

Figure 13:
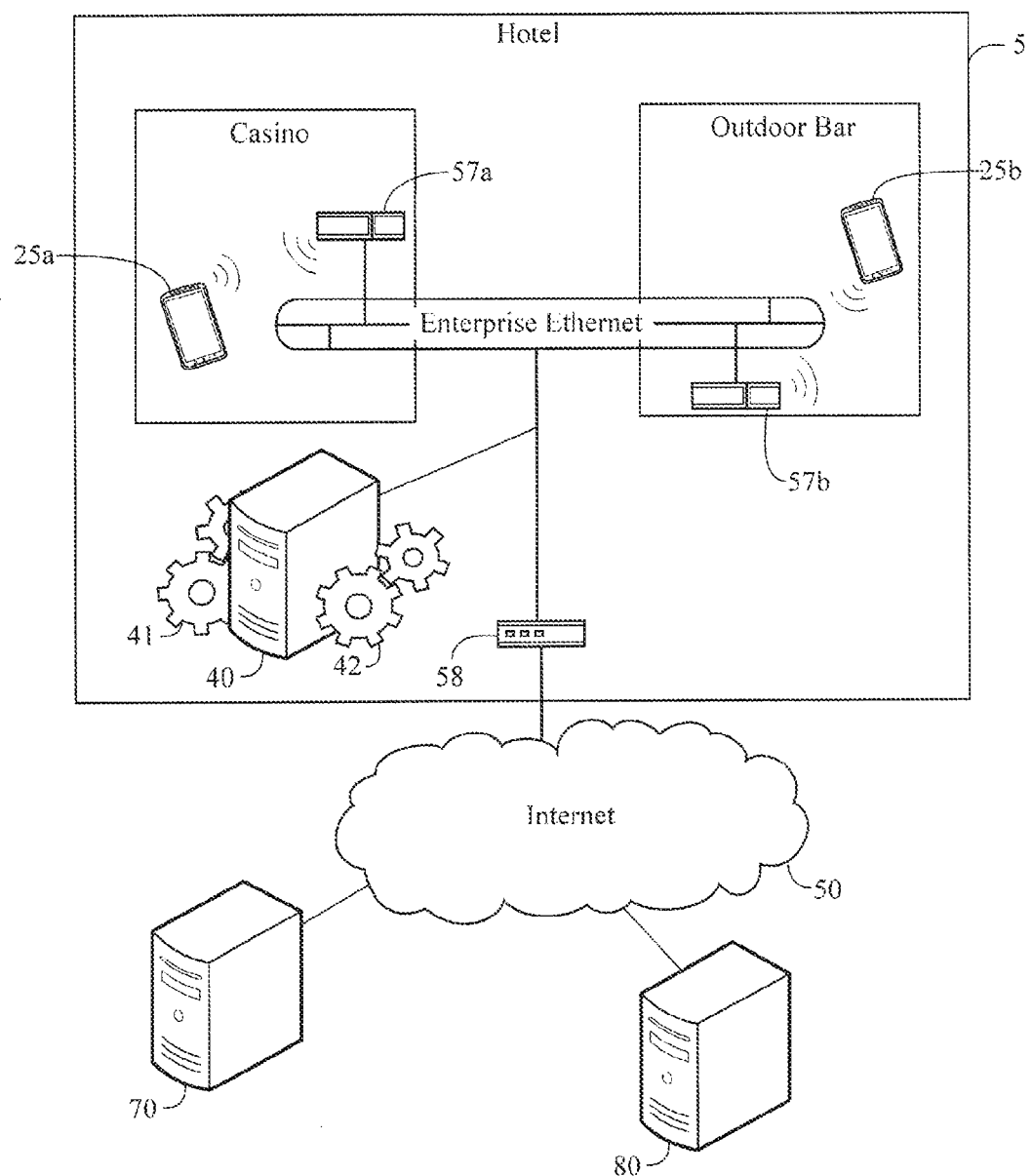
FIG. 13 is a block diagram of a system for guidance in a venue.

Another embodiment of a system for wayfinding is shown in FIG. 13. As shown in FIG. 13, a mobile communication device 25a is capable of connecting to a local area network ("LAN") through a wireless access point ("WAP") 57a or 57b of a facility 5, through an Ethernet of the facility, and through a firewall 58 of the facility. The facility has a server 40 that connects to the Internet 50. An authentication service 41 is configured to request patron input to associate the signature of the device with the identity of the patron, and a marketing content service 42 is configured to translate the signature into a patron identity ("PID"). A third-party server 80 is accessible over the Internet 50. The mobile communication device 25a has a resident mobile application for accessing the third party server 80. A content server 70 is also shown.

Figure 14:
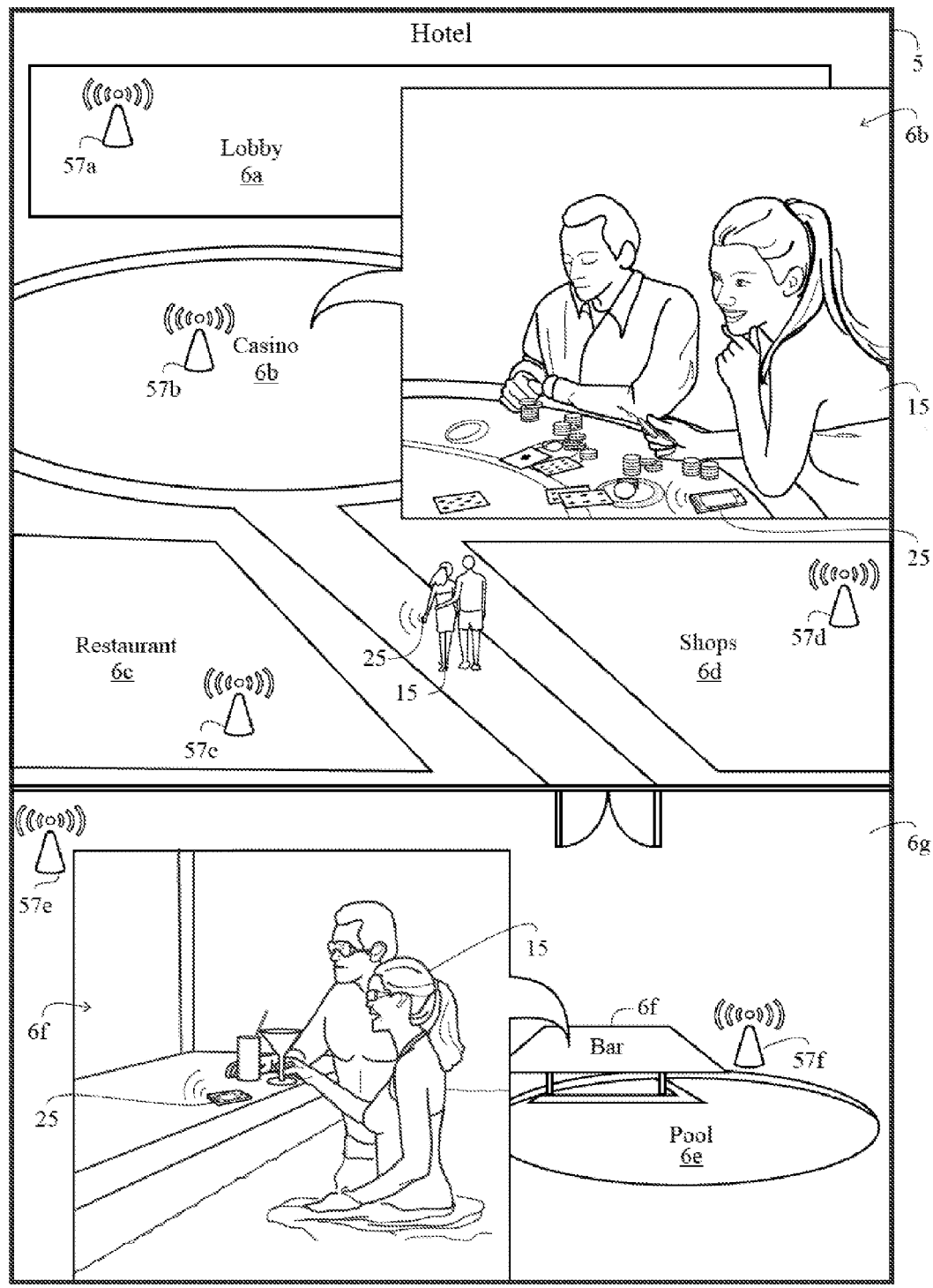
FIG. 14 is an illustration of a patron's movements throughout a venue and the ability of the venue to track the patron utilizing the present invention.

As shown in FIG. 14, a patron 15 moves through the areas 6a-6f of a resort 5, WAPs 57a-57f are able to track the mobile communication device 25 of the patron 15, allowing the facility to track his movements and monitor his time gambling or his time at a poolside bar.

The servers preferably comprise a HTTP proxy engine and scriptlet in a system memory. The servers also preferably comprise a processor, a storage, peripheral interfaces, an output controller and ports (such as audio and visual) and a communication controller and ports, such as NIC (network interface card). Those skilled in the pertinent art will recognize that more or less components may be utilized with the servers of the present invention.

The present invention may be utilized with a marketing system such as disclosed in Boyle et al., U.S. Pat. No. 8,433,342, for a Method And System For Personalized Venue Marketing, which is hereby incorporated by reference its entirety. The present invention may be utilized with a gaming system such as disclosed in Boyle, U.S. patent application Ser. No. 13/769,376, filed on Feb. 13, 2013, for a System And Method For Managing Games In A Mobile Virtual Casino, which is hereby incorporated by reference its entirety. The present invention may be utilized with a gaming system such as disclosed in Boyle, U.S. patent application Ser. No. 13/756,591, filed on Jan. 31, 2013, for a System And Method For Virtual Currency In A Virtual Casino, which is hereby incorporated by reference its entirety. The present invention may be utilized with a gaming system such as disclosed in Boyle, U.S. patent application Ser. No. 13/789,686, filed on Mar. 8, 2013, for a System And Method For Secure Play In A Mobile Virtual Casino, which is hereby incorporated by reference its entirety. The method and system of the present invention may be utilized with an anonymous loyalty program such as described in Boyle, U.S. Pat. No. 8,463,645, for an Anonymous Rewards Club Program, which is hereby incorporated by reference in its entirety. The method and system of the present invention may be utilized with the system described in Boyle et al., U.S. Pat. No. 8,693,403, for an Method And System For Detection And Correction of WiFI Login Failure, which is hereby incorporated by reference in its entirety. The method and system of the present invention may be utilized with the system described in Greer et al., U.S. patent application Ser. No. 13/775,226, filed on Feb. 24, 2013, for an Segmented Architecture Method And System, which is hereby incorporated by reference in its entirety. The method and system of the present invention may be utilized with the system described in Boyle, U.S. patent application Ser. No. 13/844,585 filed on Mar. 15, 2013, for a Method And System For Freemium WiFi Service, which is hereby incorporated by reference in its entirety. The method and system of the present invention may be utilized with the system described in Boyle, U.S. patent application Ser. No. 13/843,627 filed on Mar. 15, 2013, for a Method And System For Incentivizing On-Site Participation In Games And Offers which is hereby incorporated by reference in its entirety. The method and system of the present invention may be utilized with the system described in Boyle, U.S. patent application Ser. No. 13/974,040 filed on Aug. 22, 2013, for a Method And System For Including Content In A WiFi Stream, which is hereby incorporated by reference in its entirety. The method and system of the present invention may be utilized with the system described in Boyle, U.S. Pat. No. 8,583,777, for a Method And System For Providing Real-Time End-User WiFi Quality Data, which is hereby incorporated by reference in its entirety From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for wayfinding at a venue, the method comprising:
    launching a mobile application on a mobile communication device within a venue, the mobile application for wayfinding at the venue;
    communicating from the mobile application with a venue network through a wireless access point of the venue network;
    utilizing a venue network to determine a first fixed geographical location of the mobile communication device at the venue;
    inputting on the application a second fixed geographical location within the venue;
    guiding an end user of the mobile communication device from the first fixed geographical location to the second fixed geographical location in the venue utilizing a plurality of sensors of the mobile communication device, wherein the plurality of sensors of the mobile communication device comprises an accelerometer, a magnetometer and a gyroscope, wherein the accelerometer is configured to determine a movement of the mobile communication device and an orientation of the movement, wherein the magnetometer is configured to determine a true north heading of the mobile communication device, and wherein the gyroscope is configured to determine an orientation of the mobile communication device; and
    suspending a plurality of request transmissions from the mobile communication device while the accelerometer sensor of the mobile communication device indicates a lack of movement;
    wherein the mobile communication device is configured to calculate an error factor for the guiding the end user of the mobile communication device from the first fixed geographical location to the second fixed geographical location;
    wherein each of a plurality of subsequent approximations of the location of the mobile communication device from the latest fixed geographical location is made using the plurality of sensors, the plurality of possible paths, and the error factor which improves accuracy of approximation over time.

2. The method according to claim 1 wherein inputting on the application a second fixed geographical location comprises receiving a venue content on the mobile communication device, the venue content related to the second fixed geographical location, and accepting the venue content to activate guidance from the first fixed geographical location to the second fixed geographical location in the venue.

3. The method according to claim 1 wherein inputting on the application a second fixed geographical location comprises entering a term associated with the second fixed geographical location to activate guidance from the first fixed geographical location to the second fixed geographical location in the venue.

4. The method according to claim 3 wherein: the venue is a retail mall and term is a name of a store; the venue is a casino resort and the term is a card game; the venue is a hospital and the term is a medical department; the venue is an airport and the term is a gate number; the venue is an amusement park and the term is a ride; the venue is a convention center and the term is a conference room; the venue is a hotel and the term is a recreational facility; the venue is a municipality and the term is a government office; and the venue is a school and the term is a library.

5. The method according to claim 1 further comprising suspending request transmissions from the mobile communication device while an accelerometer sensor of the mobile communication device indicates a lack of movement to conserve a battery power of the mobile communication device.

6. The method according to claim 1 wherein the mobile communication device further comprises a display and the mobile communication device is configured to illustrate a path of the mobile communication device on a display of the mobile communication device.

7. The method according to claim 1 further comprising: requesting a supplemental first fixed geographical location for the mobile communication device within a meter of the first fixed geographical location for the mobile communication device; and calculating an error factor for the guidance of the mobile communication device from the first fixed geographical location for the mobile communication device to the supplemental first fixed geographical location for the mobile communication device, wherein the error factor is utilized for the guidance of the mobile communication device to the second fixed geographical location within the venue.

8. The method according to claim 1 further comprising: utilizing an accelerometer of the mobile communication device to adjust a location of the mobile communication device from the first fixed geographical location; requesting a supplemental first fixed geographical location for the mobile communication device; and calculating an error factor for the guidance of the mobile communication device from the first fixed geographical location for the mobile communication device to the supplemental first fixed geographical location for the mobile communication device, wherein the error factor is utilized for the guidance of the mobile communication device to the second fixed geographical location within the venue.

9. A system for wayfinding at a venue while conserving battery power of a mobile communication device, the system comprising:
    a mobile communication device comprising an application for wayfinding at the venue, a plurality of sensors and a battery, wherein the plurality of sensors of the mobile communication device comprises an accelerometer, a magnetometer and a gyroscope, wherein the accelerometer is configured to determine a movement of the mobile communication device and an orientation of the movement, wherein the magnetometer is configured to determine a true north heading of the mobile communication device, and wherein the gyroscope is configured to determine an orientation of the mobile communication device, wherein the application comprises a map of the venue; and a venue comprising a venue network with a plurality of wireless access points;

wherein the mobile communication device is configured to utilize the venue network to determine a first fixed geographical location of the mobile communication device at the venue;

wherein the mobile communication device is configured to track a path of the mobile communication device from the first fixed geographical location utilizing a plurality of sensors of the mobile communication device;

wherein the mobile communication device is configured to utilize a venue network to determine a second fixed geographical location of the mobile communication device at the venue;

wherein the mobile communication device is configured to move a current location of the path of the mobile communication device to the second geographical location for the mobile communication device at the venue; and wherein the mobile communication device is configured to suspend request transmissions from the mobile communication device while an accelerometer sensor of the mobile communication device indicates a lack of movement;

wherein the mobile communication device is configured to calculate an error factor for the guiding the end user of the mobile communication device from the first fixed geographical location to the second fixed geographical location;

wherein each of a plurality of subsequent approximations of the location of the mobile communication device from the latest fixed geographical location is made using the plurality of sensors, the plurality of possible paths, and the error factor which improves accuracy of approximation over time.

10. The system according to claim 9 wherein the guidance is one of an audio guidance, a map of the venue, directions in the form of text on a display of the mobile communication device, or a plurality of tactile signals.

11. The system according to claim 9 wherein the mobile communication device is configured to receive a venue content on the mobile communication device, the venue content related to the second fixed geographical location, and accepting the venue content to activate guidance from the first fixed geographical location to the second fixed geographical location in the venue.

12. The system according to claim 9 wherein the mobile communication device is configured to receive a term associated with the second fixed geographical location to activate guidance from the first fixed geographical location to the second fixed geographical location in the venue.

13. The system according to claim 12 wherein: the venue is a retail mall and term is a name of a store; the venue is a casino resort and the term is a card game; the venue is a hospital and the term is a medical department; the venue is an airport and the term is a gate number; the venue is an amusement park and the term is a ride; the venue is a convention center and the term is a conference room; the venue is a hotel and the term is a recreational facility; the venue is a municipality and the term is a government office; and the venue is a school and the term is a library.

14. The system according to claim 9 wherein the mobile communication device further comprises a display and the mobile communication device is configured to illustrate a path of the mobile communication device on a display of the mobile communication device.

15. The system according to claim 9 wherein the mobile communication device is configured to request a supplemental first fixed geographical location for the mobile communication device within a meter of the first fixed geographical location for the mobile communication device, and the mobile communication device is configured to calculate an error factor for guidance of the mobile communication device from the first fixed geographical location for the mobile communication device to the supplemental first fixed geographical location for the mobile communication device, wherein the error factor is utilized for the guidance of the mobile communication device to the second fixed geographical location within the venue.

16. The system according to claim 9 wherein the mobile communication device is configured to utilize an accelerometer of the mobile communication device to adjust a location of the mobile communication device from the first fixed geographical location; requesting a supplemental first fixed geographical location for the mobile communication device, and the mobile communication device is configured to calculate an error factor for guidance of the mobile communication device from the first fixed geographical location for the mobile communication device to the supplemental first fixed geographical location for the mobile communication device, wherein the error factor is utilized for guidance of the mobile communication device to the second fixed geographical location within the venue.

17. The system according to claim 9 wherein the mobile communication device is configured to suspend request transmissions from the mobile communication device while an accelerometer sensor of the mobile communication device indicates a lack of movement to conserve a battery power of the mobile communication device.

18. The system according to claim 9 further comprising a content server in communication with the venue network and configured to transmit venue content based on based on the guidance of the mobile communication from the first fixed geographical location to the second fixed geographical location.

19. The system according to claim 9 wherein the system does not use GPS for guidance.

* * * * *